H. K. EASTMAN.
PIPE COUPLING.
APPLICATION FILED JUNE 25, 1915.
1,185,487.
Patented May 30, 1916.
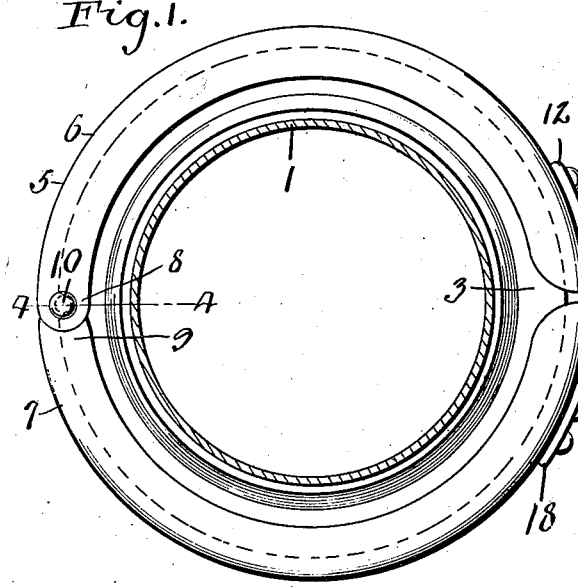
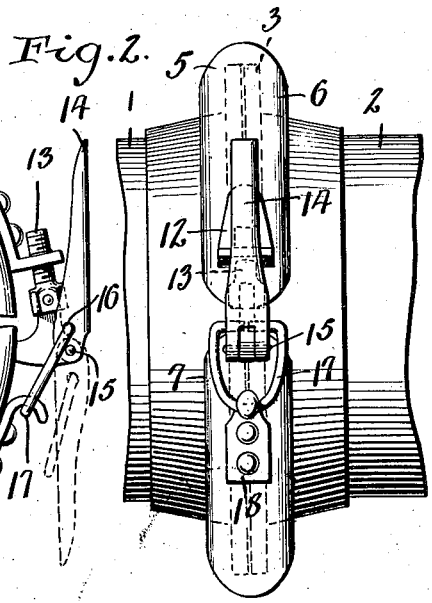
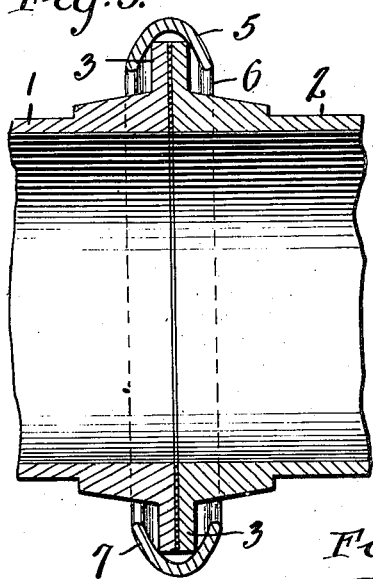
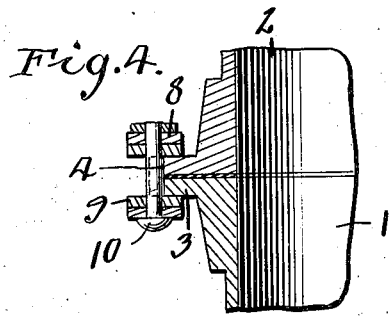
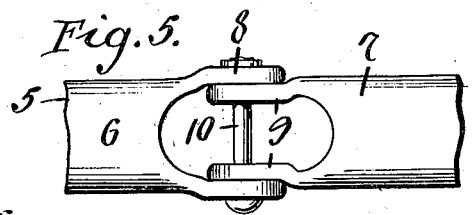
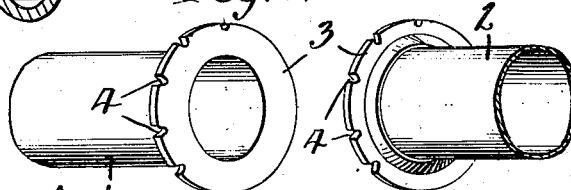
Inventor
H. K. Eastman,
By Victor J. Evans
Attorney
Witnesses

UNITED STATES PATENT OFFICE.

HAROLD K. EASTMAN, OF WATERVILLE, NEW YORK.

PIPE-COUPLING.

1,185,487.  Specification of Letters Patent.  Patented May 30, 1916.

Application filed June 25, 1915. Serial No. 36,317.

*To all whom it may concern:*

Be it known that I, HAROLD K. EASTMAN, a citizen of the United States, residing at Waterville, in the county of Oneida and State of New York, have invented new and useful Improvements in Pipe-Couplings, of which the following is a specification.

This invention relates to couplings for detachably connecting the adjacent ends of pipe sections, and particularly to a pipe coupling which is especially designed and adapted for connecting the sections of the pneumatic conducting pipes or tubes for conveying ensilage, sawdust, shavings, etc., to or from the cutters or other machines or devices which are to cut or otherwise act thereon or have been employed for that purpose.

The primary object of the invention is to provide a coupling whereby pipe or tube sections of the character described may be readily, quickly and conveniently coupled and uncoupled.

A further object of the invention is to provide a coupling which when applied will hold the pipe sections against relative longitudinal, lateral or axial movements.

A still further object of the invention is to provide a pipe coupling which, while simple, inexpensive, and positive and reliable in action, may at the same time be easily applied and removed.

The invention consists of the features of construction, combination and arrangement of parts herein fully described and claimed, reference being had to the accompanying drawing in which:—

Figure 1 is a cross section through one of two coupling pipe sections to which the invention is applied, showing the parts of the coupling in side elevation. Fig. 2 is a side elevation through the coupling pipe sections and coupling means. Fig. 3 is a vertical longitudinal section through the pipe sections and coupling. Fig. 4 is a detail section on the line 4—4 of Fig. 1. Fig. 5 is a detail view of the hinged joint between the members of the coupling ring. Fig. 6 is a perspective view showing the construction of the coupling flanges.

Referring to the drawing, 1 and 2 designate the adjacent ends of two pipe or tube sections which are to be coupled together. These sections are formed or provided with coupling flanges 3, which are, in accordance with my invention, provided each with one or more peripheral notches 4, for a purpose hereinafter described. When the ends of the pipe sections are brought together, the outer sides or faces of the flanges lie in abutting relation and the flanges are disposed at right angles to the pipe sections, as shown.

For coöperation with the coupling flanges I provide a coupling ring 5 consisting of two semi-circular sections 6 and 7. These ring sections are of channeled form in cross section, as shown clearly in Fig. 3, so as to receive and embrace the coupling flanges. At one side of the ring the ends of the ring sections are respectively bifurcated to form ears or knuckles 8 and 9 which are perforated for the passage of a pin 10 whereby the ring sections are pivotally connected, adapting the ring to be opened and closed for ready and convenient application and removal, when the pipe sections are coupled together, the flanges 3 are properly disposed to bring certain of their notches 4 into registration, and the registering notches are adapted to receive the pivot pin 10, whereby the flanges and coupling ring are locked together, thereby holding the coupling ring against circumferential motion on the flanges, while at the same time locking the flanges against motion relative to each other. By this means, the ends of the pipe or tube sections may be properly joined and locked in such joined position, so that the applied coupling will hold the pipe sections against rotary or axial movement, as well as against longitudinal and lateral movements.

The free ends of the coupling sections 6 and 7, are provided with fastening means, consisting of an angular bracket or lug 12 on the section 6 which has a threaded aperture to adjustably receive the threaded stem to a T-shaped head or connecting member 13, to which is pivoted the bifurcated cam end of a lever 14, as indicated at 15, the lever being pivoted to one of the arms of the T-head and channeled to partially receive the stem of the head when said lever is in fastening position. Above its pivot the lever has an opening 16 receiving a portion of a locking staple or link 17, which is thus pivotally connected thereto, the free end of which staple or link is adapted to engage a hooked keeper member 18 on the free end of the coupling ring section 7.

In the use of the device, the ends of the pipe sections to be coupled, which are properly equipped with the coupling flanges, are brought together, the ring then fitted in position with the pin 10 engaging registering notches 4 in the flanges, the link 17 is then engaged with the hooked keeper 18 while the lever 14 is swung outwardly to releasing position, and then said lever is swung inwardly from such position, which is indicated in dotted lines in Fig. 1, to the holding or fastening position shown in full line, by which the pivoted end of the link is brought inwardly of the pivotal point 15 of the lever thus locking the lever and the link in fastening position to hold the ring in engagement with the pipe flanges. The pipe sections will then be firmly united against relative motion in any direction, while by simply releasing the lever and opening the ring sections the pipe sections may be rotatably adjusted on one another and reunited or quickly and conveniently disconnected.

It will thus be seen that the invention provides a coupling which is particularly adapted for use upon pipes or tubes of the character specified, allowing pipe or tube sections or lengths to be quickly connected together for use and disconnected after use through the medium of a coupling which is simple and inexpensive of construction and reliable and secure, thereby overcoming the objections to ordinary forms of couplings which are either cumbersome and costly in construction or difficult to apply and remove. The advantages of the present invention will accordingly be readily understood from the foregoing description.

I claim:—

In a pipe coupling, the combination of a pair of pipe sections having abutting ends, annular flanges upon the abutting ends of the pipe sections, a ring embracing said flanges, said ring consisting of a pair of sections of substantially U-form in cross section, said sections having the walls of their channels flared to receive and engage the flanges, said flanges being provided with a series of transverse locking recesses, a pivotal connection between the ring sections comprising a cross pin adaptable for adjustable interlocking engagement with said recesses, a keeper member upon the free end of one of the ring sections, a head adjustably mounted upon the free end of the other ring section, a cam lever supported by said head, and a locking member controlled by the said lever and adapted to engage said keeper member, said locking member being adapted to be adjusted by the lever inwardly and outwardly of the plane of the pivotal connection of said lever.

In testimony whereof I affix my signature in presence of two witnesses.

HAROLD K. EASTMAN.

Witnesses:
L. P. FUESS,
HAROLD L. FUESS.